US006572546B1

United States Patent
Bax et al.

(10) Patent No.: US 6,572,546 B1
(45) Date of Patent: Jun. 3, 2003

(54) TWO LEVEL POWER SUPPLY AND METHOD FOR ULTRASOUND TRANSMISSION

(75) Inventors: Ronald F. Bax, Palo Alto, CA (US); Lazar A. Shifrin, San Jose, CA (US)

(73) Assignee: Acuson Corporation, Mountain View, CA (US)

( * ) Notice: Subject to any disclaimer, the term of this patent is extended or adjusted under 35 U.S.C. 154(b) by 0 days.

(21) Appl. No.: 09/898,199

(22) Filed: Jul. 3, 2001

(51) Int. Cl.[7] ................................................. A61B 8/00
(52) U.S. Cl. ........................................ 600/437; 323/234
(58) Field of Search ................................. 600/437–472

(56) References Cited

U.S. PATENT DOCUMENTS

| | | |
|---|---|---|
| 3,961,280 A | 6/1976 | Sampei |
| 4,099,139 A | 7/1978 | Oguri |
| 4,581,590 A | 4/1986 | Sunderland |
| 4,852,577 A * | 8/1989 | Smith et al. ............... 600/443 |
| 5,103,157 A | 4/1992 | Wright |
| 5,496,411 A * | 3/1996 | Candy ........................... 134/1 |
| 6,045,506 A * | 4/2000 | Hossack ..................... 600/443 |
| 6,078,169 A | 6/2000 | Petersen |

OTHER PUBLICATIONS

Wu, Albert M. and Sanders, Seth R., An Active Clamp Circuit for Voltage Regulation Module (VRM) Applications, IEEE Transactions on Power Electronics, vol. 16, No. 5, Sep., 2001, p. 623–634.*
Donald G. Fink and Donald Christiansen, Electronics Engineers' Handbook, p. 16–9 and 16–10, 1989.

* cited by examiner

*Primary Examiner*—Francis J. Jaworski
*Assistant Examiner*—William C Jung

(57) ABSTRACT

A two level power supply and method are provided for ultrasound transmission. A coupling capacitor is provided between a high voltage source and a low voltage source. The coupling capacitor provides direct current restoration for a two level power supply selector connected with an ultrasound transmit array. For example, a clamping circuit, including a capacitor and a diode, is provided between the high voltage and the low voltage sources. The high voltage source connects as a power supply to a pulser. Control signals are provided to the pulser to switch the output between the high voltage and ground depending on the type of ultrasound signal being transmitted. A voltage rail of the transmit array connects with the clamp circuit and receives a low voltage for CW Doppler mode imaging and a high voltage for B-mode imaging. This low cost circuitry may simplify and improve the delivery of high voltage in a two or more level power supply selection in ultrasound imaging.

23 Claims, 6 Drawing Sheets

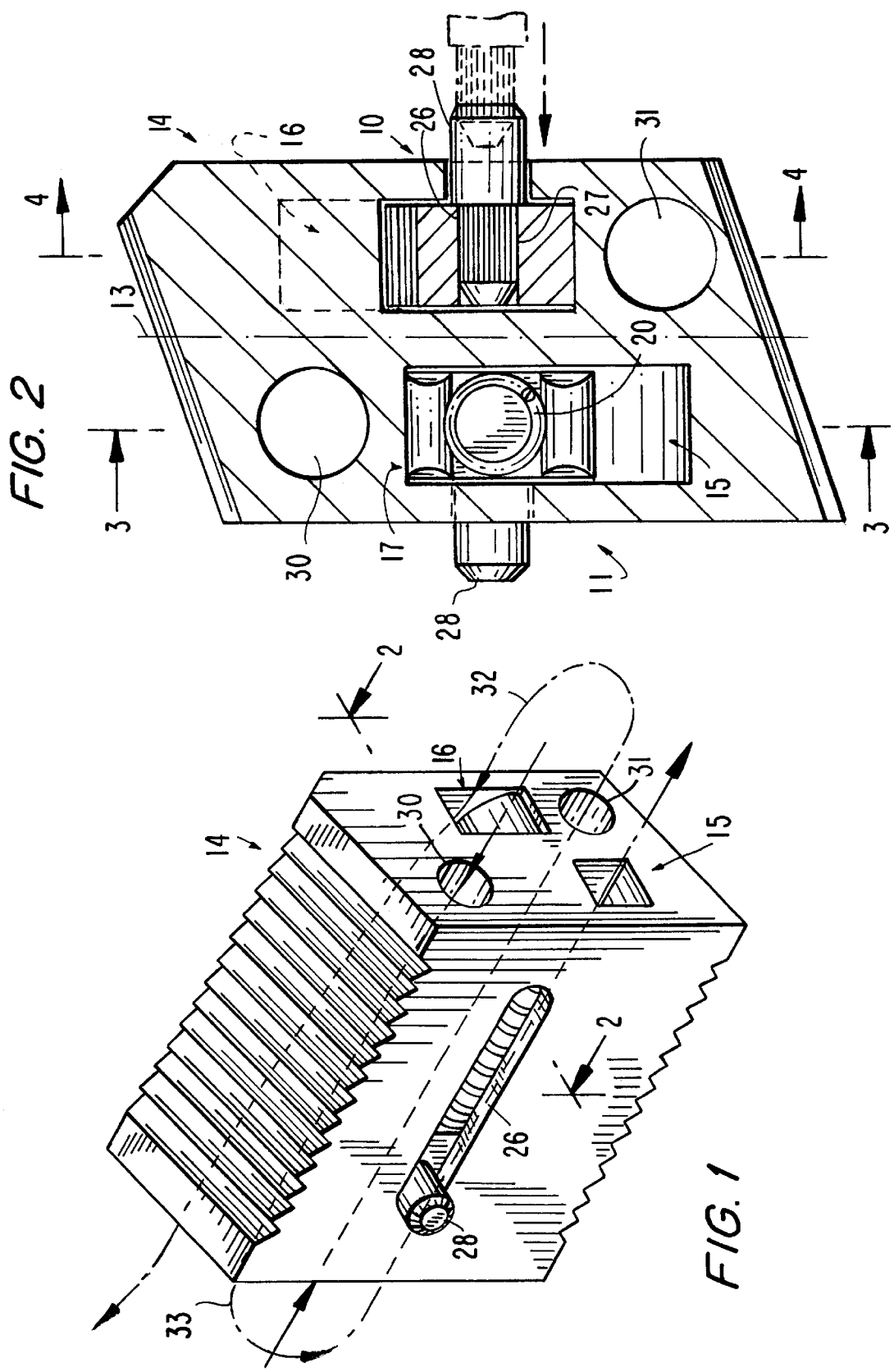

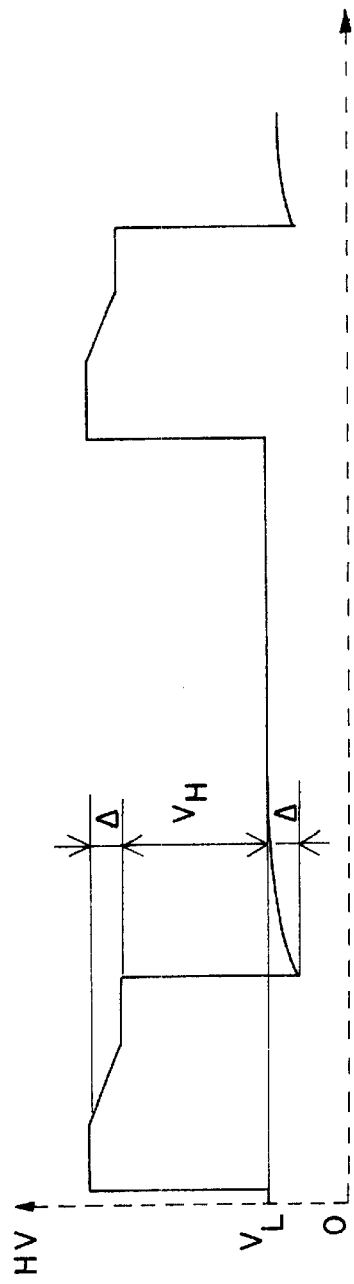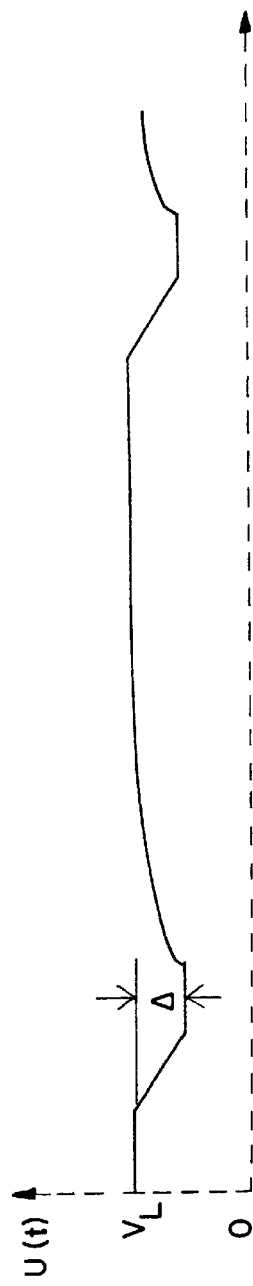

TWO LEVEL POWER SUPPLY AND METHOD FOR ULTRASOUND TRANSMISSION

BACKGROUND

This invention relates to power supplies for ultrasound radio frequency (RF) transmitters. In particular, this invention relates to power supplies providing at least two different levels of voltage and instantaneous (peak) power.

Diagnostic medical ultrasound imaging operates in both B-mode and continuous wave (CW) Doppler modes. Two-dimensional B-mode imaging typically uses short transmitted bursts of higher peak voltage and higher peak power than CW Doppler. For B-mode imaging, the transmit sequence along any given ultrasound line occurs over a short period of time, but may have a peak power of hundreds of watts. For CW Doppler mode imaging, the transmitter is substantially constantly transmitting with a lower voltage to prevent excess output power dissipation. The B-mode and CW Doppler mode transmissions are often interleaved. FIG. 1 shows transmit pulses and associated timing for B-mode and CW Doppler interleaved operation. The amplitude of the transmit signals for the B-mode imaging is greater than the amplitude of the CW Doppler transmit signal.

Different supply voltages may be provided by switches and multiple DC power supplies. The low voltage supply is generally fixed and the HV supply generally variable, but both can be varied, depending on the operation. For example, FIG. 8 shows a single pole switch 302 that connects a high voltage supply 308 to a diode 306 connected with a low voltage supply 310. When the switch 302 is open, the transmitter 300 draws current from the low voltage supply 310 through the diode 306. When the switch 302 is closed, the high voltage supply 308 supplies the current and the diode 306 is reverse biased. A bypass capacitor 314 at the transmitter 300 provides radio frequency bypass to ground and local energy storage to minimize interference to low-level circuitry.

High to low voltage transitions may require dissipation of excess energy stored in the bypass capacitor (e.g., dynamic power dissipation). The amount of energy dissipated is the difference between the high and low voltage squared multiplied by the capacitance, all divided by two.

To avoid such dissipation concerns, conventional ultrasound imaging transmitters use separate power stages for multiple switching schemes. For example, amplifier stages are used. The difference between the supply voltage and the instantaneous output voltage is applied across an amplifier's output. For efficient operation, the amplifier is supplied with a low voltage for low output power and a high voltage only for high output power.

Other arrangements may be used. FIG. 2 illustrates a multiple power supply amplifier 100 as disclosed in U.S. Pat. No. 3,961,280. The amplifier 100 includes an amplifying transistor 102 connected with a load 104, a switching transistor 106, a high voltage source 108, a low voltage source 110 and a diode 112. The amplifier 100 adjusts the power supply voltage in response to the magnitude of the input signal or the signal to be transmitted. When an input signal 114 is less than the voltage from the low voltage source 110, the diode 112 is forward biased, and the switching transistor 106 is turned off. The amplifying transistor 102 is powered by the low voltage source 110. When the input signal 114 is larger than the voltage provided by the low voltage source 110, the base-emitter junction of the switching transistor 106 becomes conductive, reversing the voltage applied to the diode 112. The switching transistor 106 conducts the higher voltage from the high voltage source 108 to the load.

As an alternative to detecting the instantaneous magnitude of the input signal for selecting power supplies described above, programmable amplifiers may be used. For example, U.S. Pat. No. 6,078,169 discloses a programmable power supply circuit. Analogous circuitry 200 is shown in FIG. 3. A plurality of switches 204a–d and power supplies 202a–d are provided for selecting and powering a transmit array 208. A micro-controller 206 controls the switches 204a–d to select one of the power sources 202a–d. Like FIG. 2, excess energy stored in the bypass capacitance of the transmit array is dissipated in a resistor or used to recharge a power source.

BRIEF SUMMARY

The present invention is defined by the following claims, and nothing in this section should be taken as a limitation on those claims. By way of introduction, the preferred embodiments described below include ultrasound multi-level power supplies for ultrasound imaging.

In one embodiment, a coupling capacitor is provided indirectly between a high voltage source and a low voltage source. The coupling capacitor provides direct current restoration for a two level power supply selector connected with an ultrasound transmit array.

In a further embodiment, a clamping circuit, including a capacitor and a diode, is provided indirectly between the high voltage and the low voltage sources. The high voltage source connects as a power supply to a pulser. Control signals are provided to the pulser to switch the output between the high voltage and ground depending on the type of ultrasound signal being transmitted. A voltage rail of the transmit array connects with the clamp circuit and receives a low voltage for CW Doppler mode imaging and a higher voltage for B-mode imaging. This low cost circuitry may simplify and improve the delivery of high voltage in a two level power supply selection in ultrasound imaging.

In a first aspect, a two level power supply for ultrasound imaging is provided. A coupling capacitor is connected indirectly between first and second voltage supplies. The second voltage supply has a higher voltage than the first voltage supply. At least one ultrasound transmit element operatively connects with the first and second voltage supplies.

In a second aspect, another two-level power supply for ultrasound imaging is provided. A plurality of ultrasound transmit cells connects with a voltage rail. A capacitor-coupled clamp circuit also connects with the voltage rail. A bias port of the capacitor coupled clamp circuit connects with a first voltage supply. An input of the capacitor coupled clamp circuit connects with a pulser. A second voltage supply provides power to the pulser.

In a third aspect, a method for providing power in an ultrasound imaging system is provided. A higher voltage is applied to an ultrasound transmit element. A lower voltage is then applied to the ultrasound transmit element. During generation of the lower voltage, direct current is restored for subsequent repetition of the generation of the higher voltage. The lower voltage characterizes the level of restoration.

In a fourth aspect, a method for providing power in an ultrasound imaging system is provided. High and low voltages are supplied. A high transmit voltage is generated and comprises the sum of the high and low voltages. A low transmit voltage is generated comprising the low voltage.

During generation of the high transmit voltage, a capacitor is discharged. The capacitor is recharged with the low voltage.

Further aspects and advantages of the invention are discussed below in conjunction with the preferred embodiments.

BRIEF DESCRIPTION OF SEVERAL VIEWS OF THE DRAWINGS

The components in the Figures are not necessarily to scale, emphasis instead being placed upon illustrating the principles of the invention. Moreover, in the Figures, like reference numerals designate corresponding parts throughout the different views.

FIGS. 6A and 6B are graphs of one embodiment of direct current restoration associated with the transmit of the pulses shown in FIG. 5A.

DETAILED DESCRIPTION OF THE PREFERRED EMBODIMENTS

A coupling capacitor is used for direct current restoration. The energy lost due to transmission is restored by energy from the low voltage supply. Such restoration reduces the energy loss of the power supply circuit.

Figure 3:
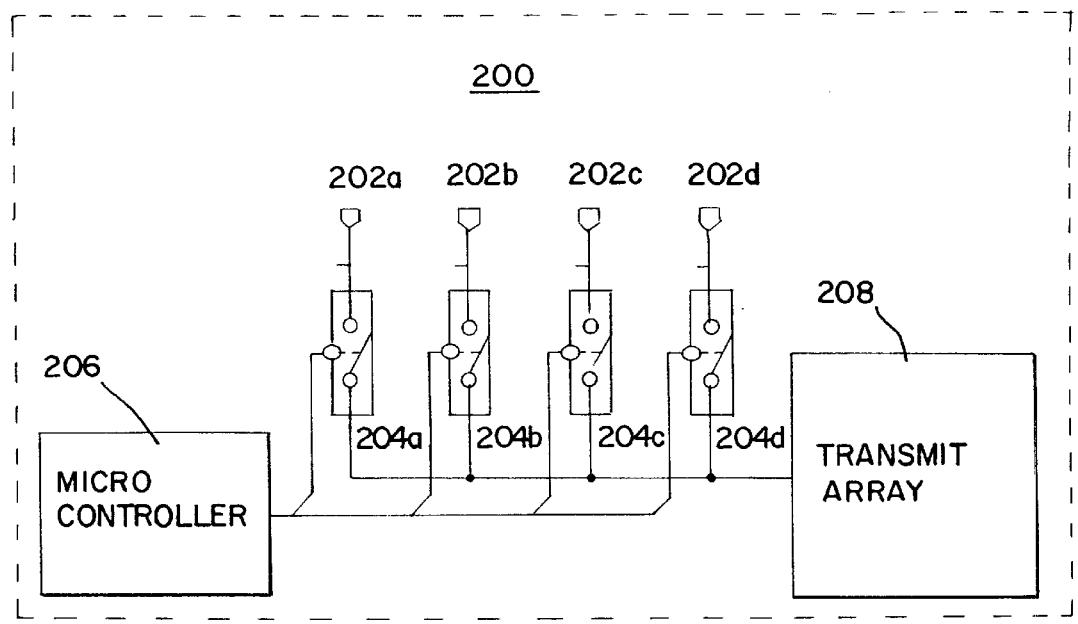
FIG. 3 is a circuit diagram of a multiple power supply amplifier for ultrasound imaging.
Figure 4:
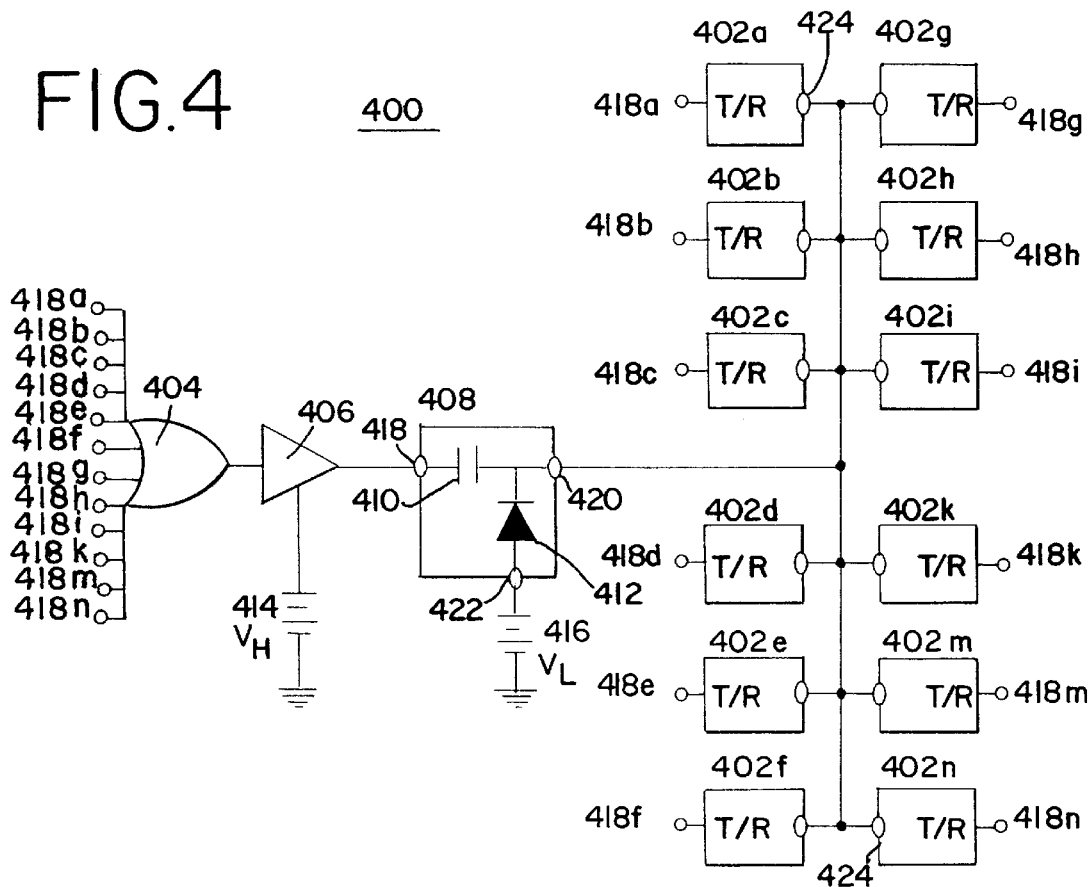
FIG. 4 is a circuit diagram of one embodiment of a two level power supply for ultrasound imaging.

FIG. 4 shows one embodiment of a two-level selectable power supply circuit for ultrasound imaging. The circuit 400 includes a plurality of transmit cells 402a–n, a high voltage rail 424, a multi-input OR gate 404, a pulser 406, a high voltage supply 414, a low voltage supply 416 and a clamp circuit 408. Other circuit arrangements, including more or fewer ultrasound transmit cells 402, may be provided.

The OR gate 404 comprises digital logic, an integrated circuit, or an analog node or connection point. In alternative embodiments, the OR gate 404 comprises a processor or other digital control circuit. The OR gate 404 controls generation of high and low powers or voltages as a function of multiple inputs. The multiple inputs are connected with the signal to be transmitted or an analog or digital signal representing timing associated with signals to be transmitted. In alternative embodiments, a single input is provided.

The multiple input OR gate 404 produces a strobe for generation of high power or voltage for transmissions by the ultrasound transmit cells. The strobe signal is provided to the pulser 406 as a high voltage control signal. The high power or voltage is maintained for transmission by each of the ultrasound transmit cells 402 as a function of the transmission delay profile. A logical zero or a low strobe signal is provided for timing associated with low power transmissions, such as CW Doppler imaging. In alternative embodiments, a logical zero or a low strobe signal represents high power transmission.

The pulser 406 comprises an amplifier, integrated circuit or a single pole-two position high voltage switch (e.g., solid-state: FETs, bipolar transistors, SCRs, TRIACS or other 4 layer devices). Micromachined relays, high vacuum or gas discharge switches, or a triggered spark gap pair (with or without a step-up transformer, or saturated magnetic core(s)) may also be used.

The high voltage supply 414 connects as a power supply for the pulser 406. In response to a high voltage transmit signal from the OR gate 404, the pulser 406 drives the clamp circuit 408 with a positive pulse approaching the high voltage supply. In response to a low power transmit signal from the OR gate 404, the pulser's output is driven to a level approaching ground. In alternative embodiments, the pulser 406 provides a positive pulse in response to a low power transmission control signal. The high voltage supply 414 and the pulser 406 comprise a pulsed voltage source. The high voltage supply 414 is a fixed or variable supply. The energy savings diminishes as the square of the voltage ratio between the low and high voltage supplies 414, 416.

The high voltage supply 414 comprises a DC to DC or AC to DC converter, battery, a voltage divider or other source of DC voltage. At sufficient current, the high voltage supply 414 supplies power for driving the pulser 406.

The clamp circuit 408 comprises a capacitor-coupled clamp circuit The clamp circuit 408 includes a coupling capacitor 410 and a diode 412. In alternative embodiments, additional or fewer components are included in the clamp circuit 408, such as just the coupling capacitor 410. One terminal of the capacitor 410 connects to the output of the pulser 406 as an input 418 of the clamp circuit 408. The other terminal of the capacitor 410 connects to the diode 412 and an output 420 of the clamp circuit 408. The other terminal of the diode 412 comprises a bias port 422 of the clamp circuit 408. The bias port 422 connects with the low voltage supply 416.

The capacitor 410 is connected in series between the pulser 406 or the pulsed voltage supply and output 420 of the clamp circuit 408. As used herein, "between" includes both directly between and indirectly between, such as through one or more additional devices. The low voltage supply 416 and diode 412 connect with the voltage rail 424 and supply low voltage to the voltage rail 424 when the pulser output is at or near ground potential. The capacitor 410 connects indirectly between the high and low voltage supplies 414, 416.

The low voltage supply 416 comprises an AC to DC or DC-to-DC converter, a battery, a voltage divider, or other device for supplying a DC voltage at sufficient current. The voltage of the low voltage supply 416 is lower than the voltage of the high voltage supply 414. The low voltage supply 416 is fixed or variable.

The voltage rail 424 comprises a high voltage rail. For example, the voltage rail 424 comprises a wire, cable, printed circuit, or other conductor for providing high and low voltages to the ultrasound transmit cells 402. The voltage rail 424 is referred to as a high voltage rail herein to represent the capability for carrying high voltages used in ultrasound imaging, such as about 200 volts.

The ultrasound transmit cells 402a–n each comprise an RF transmitter and a transducer element, such as piezoelectric element or capacitive micro-electromechanical device. Additional circuitry may be provided for one or more of the ultrasound transmit cells, such as amplifiers and filters for processing the input transmit signal provided on the input 418a–n from a transmit beam former. The plurality of ultrasound transmit cells comprise a transmit array.

Figure 5A:
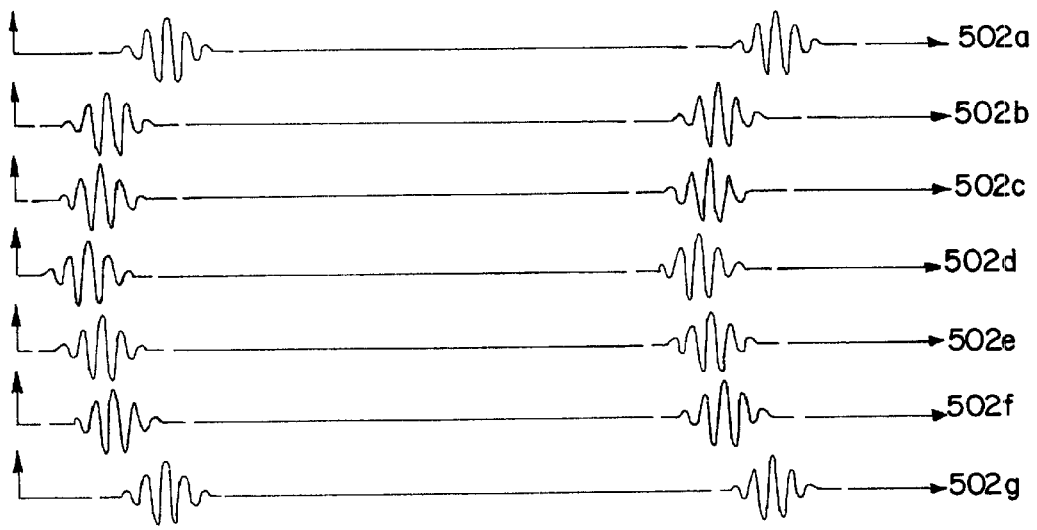
FIG. 5A is a schematic diagram representing B-mode transmit waveforms on multiple channels and their associated timing in one embodiment.
Figure 5B:
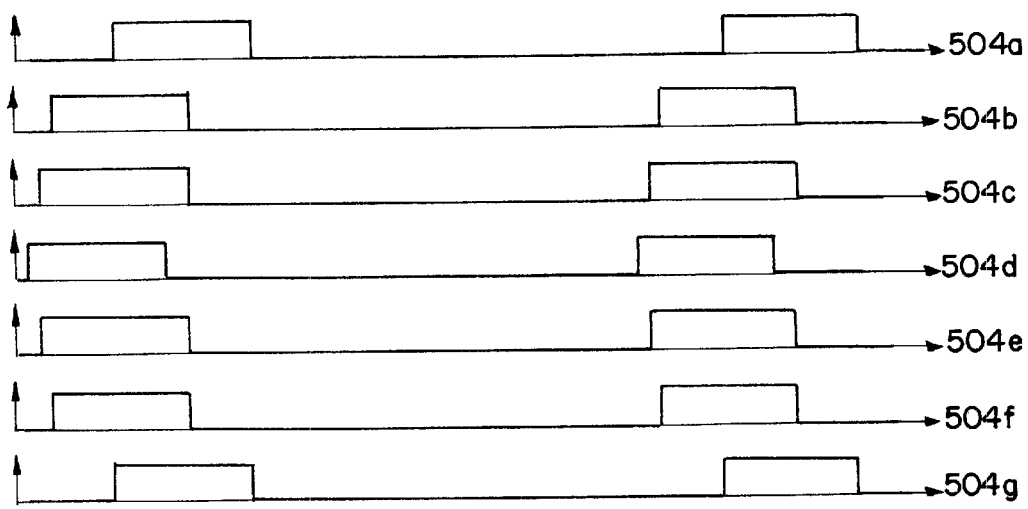
FIG. 5B is a timing diagram of one embodiment showing the high power supply usage by the transmit waveforms of FIG. 5A.

The two-level power supply circuit 400 provides high or low voltage or power to the ultrasound transmit cells 402 in response to signals input to the OR gate 404. FIG. 5A shows B-mode transmit signals and their respective timing for a plurality of channels (e.g., 7). FIG. 5B shows associated high power or higher voltage control signals 504a–g for each channel corresponding to the respective transmit signals 502a–g of FIG. 5A. The high power control signal 504 is "on" for a period of time long enough to transmit the high voltage transmit waveform associated with that channel. The timing of the high power control signal 504 and associated transmit waveform 502 varies as a function of channel. The high voltage transmit control signal 504 varies as a function of the operational mode for that channel, such as varying between operation for B-mode and CW Doppler mode imaging. In alternative embodiments, the high power control signal is set as a low signal and the low power control signal is set as a high signal.

Figure 5C:
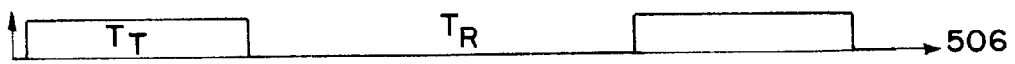
FIG. 5C is a timing diagram of one embodiment of a composite use of high power by a plurality of channels.

The strobe or control signal output from the OR gate 404 (FIG. 4) is represented in FIG. 5C. A high signal is sent for providing a high voltage or power, and a low or zero voltage signal is sent for providing low power. In alternative embodiments, high power is associated with a low signal and low power is associated with a high signal. The channel delay profile of the high power transmissions is accounted for in the control signal 506. The duration of the high power signal corresponds to the beginning of the earliest transmit waveform using a high power and the end of the last transmit waveform using the high power for any transmission sequence or burst.

For providing a high voltage on the rail 424, the pulser 406 outputs a high voltage in response to the high voltage control signal from the OR gate 404. The high voltage output by the pulser 406 is about the same as the high voltage provided by the high voltage supply 414. In alternative embodiments, a voltage that is less than the high voltage provided by the high voltage supply 414 is output by the pulser 406.

The high voltage from the pulser 406 is provided to the clamp circuit 408. The clamp circuit 408 delivers a high voltage to the voltage rail 424 and each of the ultrasound transmit cells 402. The high voltage from the pulser 406 shifts the voltage on the voltage rail 424 up as a function of the coupling capacitor 410 being coupled to the cathode of the diode 412. The amount of the shift is a function of the voltage applied to the bias port 422 of the clamp circuit 408. As a result, the voltage rail 424 is provided with a high voltage that is substantially the sum of the high voltage from the pulser 406 and the low voltage from the low voltage supply 416.

For providing a low voltage on the voltage rail 424, the pulser 406 outputs a ground or low voltage signal in response to the low voltage control signal from the OR gate 404. One terminal of the capacitor 410 is grounded or provided with a low voltage. As a result, the low voltage from the low voltage supply 416 is provided to the voltage rail 424.

During transmission, one or more of the ultrasound transmit cells 402 draws current. For high voltage transmission, the capacitor 410 is partially discharged by this load current as shown in FIG. 6A. The resulting voltage droop, $\Delta$, is shown where the solid line represents the voltage provided on the voltage rail 424. The transmit discharge associated with the droop is recuperated when the mode is switched to provide a lower voltage on the voltage rail 424. The capacitor 410 is connected to a grounded output of the pulser 406 and to the low voltage provided by the low voltage supply 416 via the diode 412. As shown in FIG. 6B, while in the low voltage mode, the capacitor 410 is recharged. The DC level of the multi-level power supply circuit 400 is restored as a function of the low voltage provided by the low voltage supply 416.

In one embodiment, the low voltage supply 416 provides a voltage that is greater than the voltage droop caused by transmission, The capacitance of the coupling capacitor 410 is selected as a function of the amount of time the multi-level power supply circuit 400 operates in the low voltage supply mode. The time constant RC of the circuit 400 is selected such that it is much less than any continuous time of operation in the low power mode, where R represents the total resistive loss incurred in the pulser 406, the diode 412, wiring and any other source of resistive loss. The capacitor 410 is recharged to the low voltage by the CW Doppler transmission.

The voltage across the capacitor 410 at the beginning of a recuperation interval associated with transmission in a low voltage mode is the low voltage of the low voltage supply 416 minus the droop, $\Delta$. The multi-level power supply circuit 400 consumes energy from the low voltage supply 416 to restore the energy loss or droop. When the pulser 406 switches from the high voltage transmit mode to a low voltage transmit mode, the voltage across the capacitor settles to the low voltage provided by the low voltage supply 416.

The transition process is expressed by:

$$u(t) + RC\frac{du}{dt} = V_L$$

where u(t) represents the voltage across the capacitor and $V_L$ represents the low voltage. This differential equation is solved to yield the voltage across the capacitor as:

$$u(t) = \Delta + C_0 \exp(-t/\iota)$$

where $\iota = RC$ and $C_0$ is a constant of integration. At the beginning of the transition from high to low voltage (u(0)), the voltage across the capacitor is equal to $V_L - \Delta$, so that $C_0 = -\Delta$. The settling process is further expressed as:

$$u(t) = V_L - \Delta \cdot \exp(-t/\iota).$$

Since u(t) relates to the transferred charged $$q(t) = \int_0^t i(t)dt \text{ as } q(t) = C \cdot u(t),$$

the transitional current, i(t) is given by:

$$i(t) = C \cdot \frac{du}{dt} = \frac{\Delta}{R} \cdot \exp(-t/\tau)$$

Thus, the instantaneous power, P(t), derived from $V_L$ becomes:

$$P(t) = V_L \cdot i(t) = \frac{\Delta \cdot V_L}{R} \exp(-t/\tau)$$

Accordingly, the amount of energy consumed from the low voltage supply yields:

$$E_R = \int_0^\infty P(t) dt = \Delta V_L C$$

As compared against a two level transmit power selector where the high voltage supply is switched on or off described above in the background section, the multi-level power supply circuit 400 provides much less energy loss where a capacitance in the transmit array of the same size as the capacitor 410 is provided as part of the load. For example, where the voltage droop due to transmission is around 10 volts, the high voltage supply provides 200 volts and the low voltage supply provides around 40 volts, the energy loss for the circuit 400 is about 1/32 of a switched high voltage circuit.

Figure 7:
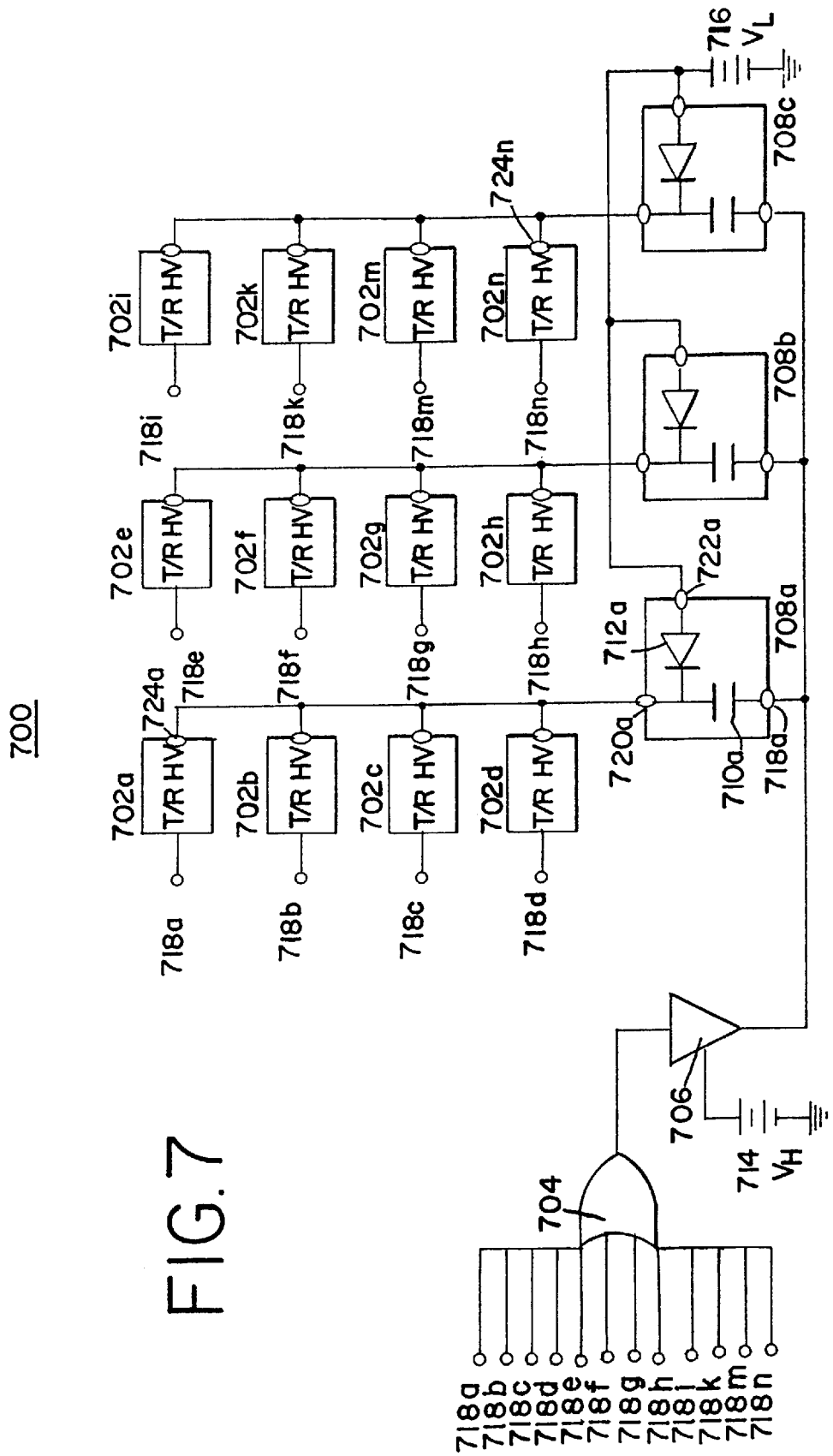
FIG. 7 is a circuit diagram of one embodiment of a two level power supply with a plurality of clamp circuits used for ultrasound imaging.
Figure 8:
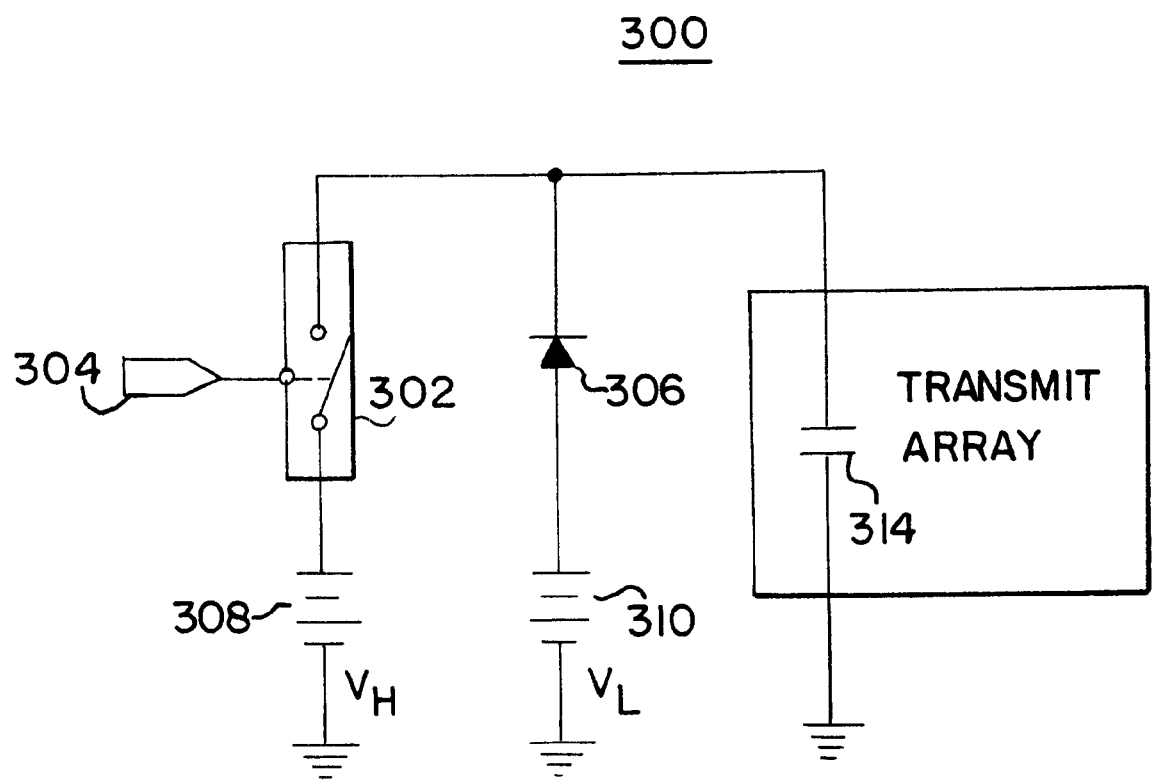
FIG. 8 is a programmable power supply circuit.

FIG. 7 shows one embodiment of a multi-level power supply circuit 700 using a plurality of clamp circuits 708a–c, similar to clamp circuit 408. While three clamp circuits 708a–c are shown, two, or four or more clamp circuits 708 may be provided. Each of the additional clamp circuits 708a–c comprises a capacitor-coupled clamp circuit, including a capacitor 710a–c and a diode 712a–c. The clamping circuits 708a–c and associated coupling capacitors 710a–c and diodes 712a–c are connected as described above for FIG. 4. In particular, the low voltage source 716 connects to a bias port of each of the clamp circuits 708a–c, and the pulser 706 connects to the inputs 718a–c of the clamp circuits 708a–c. The capacitors 710a–c are connected indirectly between the high voltage supply 714 and the low voltage supply 716.

The ultrasound transmit cells 702a–n are divided into groups or sets as a function of the number of clamp circuits 708a–c. For example and as shown, three groups of ultrasound transmit cells 702 are provided. Separate voltage rails 724 are provided for each of the groups of ultrasound transmit cells 702. Each clamp circuit 708a–c connects to a respective voltage rail 724

In use, the OR gate 704 provides a control signal to the pulser 706. In response to the control signal, the pulser 706 causes the multi-level power supply circuit 700 to operate in a high voltage or low voltage mode. In a high voltage mode, the voltage from the high voltage supply 714 or another high voltage is provided to the clamp circuits 708a–c. As discussed above, the clamp circuits 708a–c operate to provide a higher voltage to the associated voltage rails 724. For the low voltage mode, the output of the pulser 706 is grounded, resulting in the low voltage from the low voltage supply 716 being applied to the voltage rails 724.

The parallel arrangement of the diodes 412a–c provides for minimized resistive losses and peak recharge current. For example, where the ratio of the time constant RC to the low power mode transmission time is around 0.2, a minimal transmission time in the low power mode of 25 microseconds provides a 5 microsecond RC time constant. Given a capacitance value of 25.6 μf, the overall resistive losses may be less than 0.2 ohms with a peak recharge current approaching 50 amps.

In one embodiment, the diodes 712a–c have a matched resistance, such as being within 5% in one embodiment and preferably essentially identical. Having a plurality of clamp circuits 708a–c also allows for a higher conductor resistance on a printed circuit board including the circuit 700 than having a single clamp circuit 708.

With a plurality of coupling capacitors 710a–c, each coupling capacitor 710a–c is selected as an equal fraction of the desired capacitance. The fractional capacitance decreases the peak recharge current for each clamp circuit 708a–c. Having a plurality of clamp circuits 708a–c optimizes the high voltage distribution.

As used herein, "connected with" or "connected to" include both direct and indirect connections. For example, the coupling capacitor 410 is connected with the high voltage supply 414 through the pulser 406.

While the invention has been described above by reference to various embodiments, it will be understood that many changes and modifications can be made without departing from the scope of the invention. For example, additional circuitry may be added to the multi-level power supply circuits 400, 700, any number of coupling capacitors in series or parallel may be used, various control structures other than the OR gate 404 may be used for switching between high voltage and low voltage modes, and different ultrasound transmit cells or associated elements may be used.

It is therefore intended that the foregoing detailed description be understood as an illustration of the presently preferred embodiments of the invention, and not as a definition of the invention. It is only the following claims, including all equivalents that are intended to define the scope of the invention.

What is claimed is:

1. An ultrasound two-level power supply for ultrasound imaging, the ultrasound power supply comprising:
    a first voltage supply;
    a second voltage supply, the second voltage supply having a higher voltage than the first voltage supply;
    a capacitor-coupled clamp connected with a voltage rail, the first voltage supply connected with the capacitor-coupled clamp;
    at least one ultrasound transmit element operatively connected with voltage rail; and
    a pulser having a voltage supply input connected with the second voltage supply and an output connected with the capacitor-coupled clamp.

2. The supply of claim 1 wherein the at least one ultrasound transmit element comprises a plurality of transducer elements.

3. The supply of claim 1 further comprising an OR gate operative to receive high power transmit on signals, the OR gate operatively connected with the pulser.

4. The supply of claim 1 wherein the capacitor-coupled clamp circuit comprises a coupling capacitor and a diode, the diode connected between the first voltage supply and the coupling capacitor.

5. The supply of claim 4 wherein the output of the pulser connects with the coupling capacitor at a terminal different than the diode.

6. The supply of claim 1 further comprising:
    at least two of the capacitor-coupled clamp circuits each having a capacitor and a diode, the first voltage supply connected with each of the clamp circuits;
    wherein the at least one ultrasound transmit element comprises at least two sets of ultrasound transmit elements, each set of ultrasound transmit elements connected with a respective clamp circuit.

7. The supply of claim 1 wherein the voltage rail comprises a plurality of voltage rails;

further comprising a plurality of capacitor-coupled clamps connected with the first voltage supply and each of the plurality of capacitor-coupled clamps respectively connected with one of the plurality of voltage rails.

8. An ultrasound two level power supply for ultrasound imaging, the ultrasound power supply comprising:

a plurality of ultrasound transmit cells;

a voltage rail connected with the plurality of ultrasound transmit cells;

a pulser having an output and a voltage supply input;

a first voltage supply connected with the voltage supply input;

a capacitor-coupled clamp circuit having an input connected with the output of the pulser, an output connected with the voltage rail and a bias port; and a second voltage supply connected with the bias port.

9. The supply of claim 8 wherein the first voltage supply is operable to provide a higher voltage than the second voltage supply.

10. The supply of claim 8 wherein the capacitor-coupled clamp circuit comprises a capacitor and a diode.

11. The supply of claim 8 further comprising an additional capacitor-coupled clamp circuit connected with an additional voltage rail and the output of the pulser.

12. The supply of claim 8 wherein a voltage level on the voltage rail is responsive to a continuous wave imaging control input to the pulser.

13. A method for providing power in an ultrasound imaging system, the method comprising:

(a) providing a higher voltage at an ultrasound transmit element;

(b) providing a lower voltage at the ultrasound transmit element after (a);

(c) during (b), restoring direct current for subsequent repetition of (a), the level of restoration characterized by the lower voltage.

14. The method of claim 13 further comprising:

(d) inputting a plurality of higher voltage control signals into an OR gate; and (e) performing (a) as a function of an output of the OR gate.

15. The method of claim 13 wherein (c) is responsive to a capacitor-coupled clamp connected between a pulser and a low voltage source.

16. A method for providing power in an ultrasound imaging system, the method comprising:

(a) supplying a high voltage;

(b) supplying a low voltage;

(c) generating a high transmit voltage comprising a sum of the high and low voltages;

(d) generating a low transmit voltage comprising the low voltage;

(e) discharging a capacitor during (c); and (f) recharging a capacitor with the low voltage.

17. The method of claim 16 further comprising:

(g) inputting a plurality of high voltage control signals into an OR gate; and (h) switching between (c) and (d) as a function of an output of the OR gate.

18. The method of claim 16 wherein (e) and (f) are responsive to the capacitor being connected in series between a high voltage pulser and a high voltage rail.

19. An ultrasound two-level power supply for ultrasound imaging, the ultrasound power supply comprising:

a pulsed voltage source;

a DC voltage source;

a clamp circuit connecting the pulsed voltage source with the DC voltage source.

20. The supply of claim 19 wherein the voltage sources have a same polarity referred to ground;

further comprising a plurality of transmit cells, each of said cells having a high voltage rail, the plurality of transmit cells connected with a clamp output of the clamp circuit.

21. The supply of claim 20 further comprising:

a multi-input OR gate having a single output;

wherein the pulsed voltage source comprises a pulser utilizing another DC voltage source and having input and output terminals, wherein the output of said multi-input OR gate is coupled to the input terminal of said pulser so that the output of said pulser delivers a voltage produced by said other voltage source during any of transmit intervals responsive to a plurality of T/R control signals connected with inputs of said multi-input OR gate.

22. The supply of claim 21 wherein the clamp circuit comprises a capacitor, a diode, a clamp input, the clamp output and a bias port configured in such a way that: the capacitor is coupled between the clamp input and the clamp output, the diode is coupled between the clamp output and the bias port, the clamp input is connected to the output of said pulser, said high voltage rails are connected to the clamp output, said bias port is connected to said DC voltage source.

23. The supply of claim 21 comprising a plurality of said clamp circuits, each output port of said plurality of clamp circuits connected to a set of said high voltage rails, all bias ports of said plurality of clamp circuits connected to said DC voltage source, all input ports of said clamp circuits are connected to the output terminal of said pulser.

* * * * *

UNITED STATES PATENT AND TRADEMARK OFFICE
CERTIFICATE OF CORRECTION

PATENT NO. : 6,572,546 B1
APPLICATION NO. : 09/898199
DATED : June 3, 2003
INVENTOR(S) : Ronald F. Bax and Lazar A. Shifrin It is certified that error appears in the above-identified patent and that said Letters Patent is hereby corrected as shown below:

On the Title Page

Figure 4, our first embodiment, should replace the current figure on the cover of this patent.

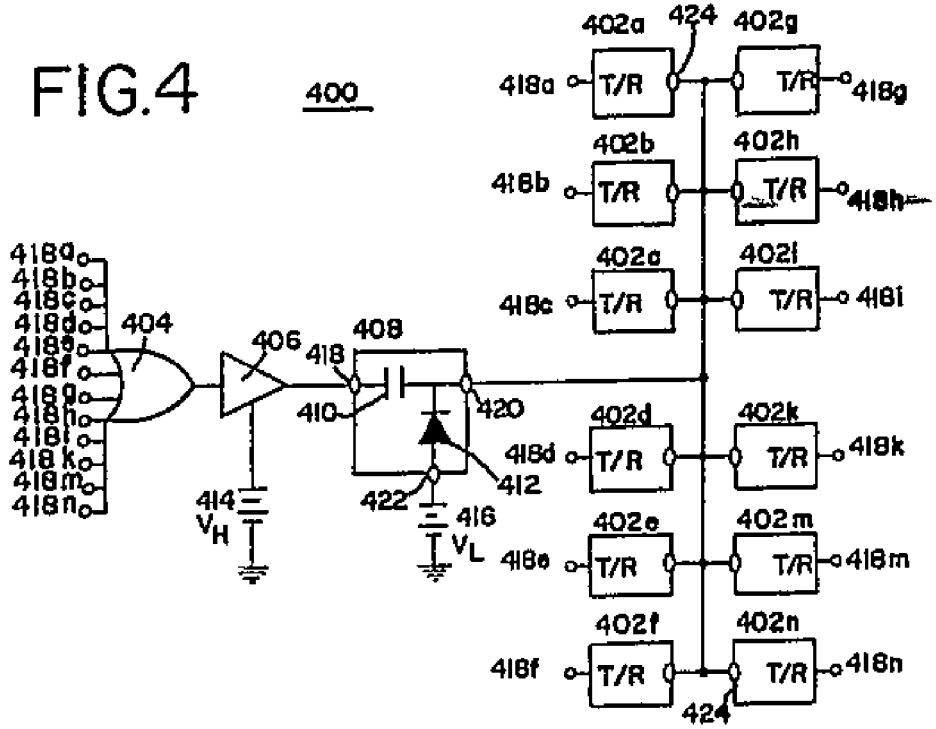

UNITED STATES PATENT AND TRADEMARK OFFICE
CERTIFICATE OF CORRECTION

PATENT NO.       : 6,572,546 B1
APPLICATION NO.  : 09/898199
DATED            : June 3, 2003
INVENTOR(S)      : Ronald F. Bax and Lazar A. Shifrin It is certified that error appears in the above-identified patent and that said Letters Patent is hereby corrected as shown below:

On Page 2

Figure 1:
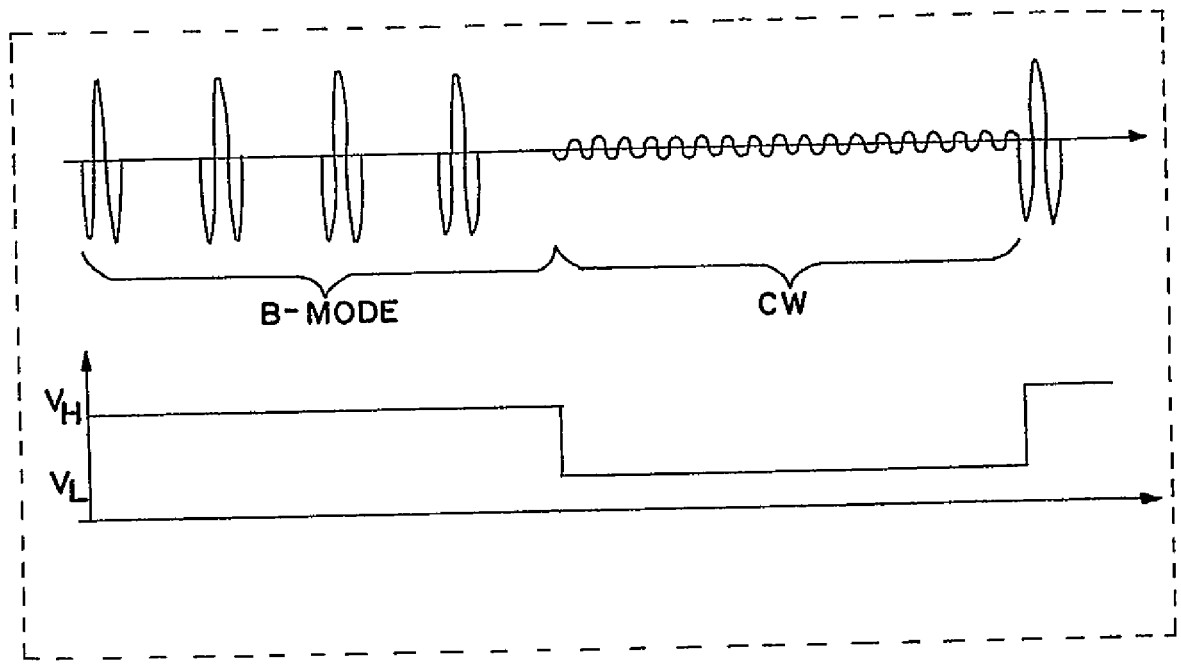
FIG. 1 is a timing diagram and associated transmit waveform schematic for CW Doppler and B-mode imaging.
Figure 2:
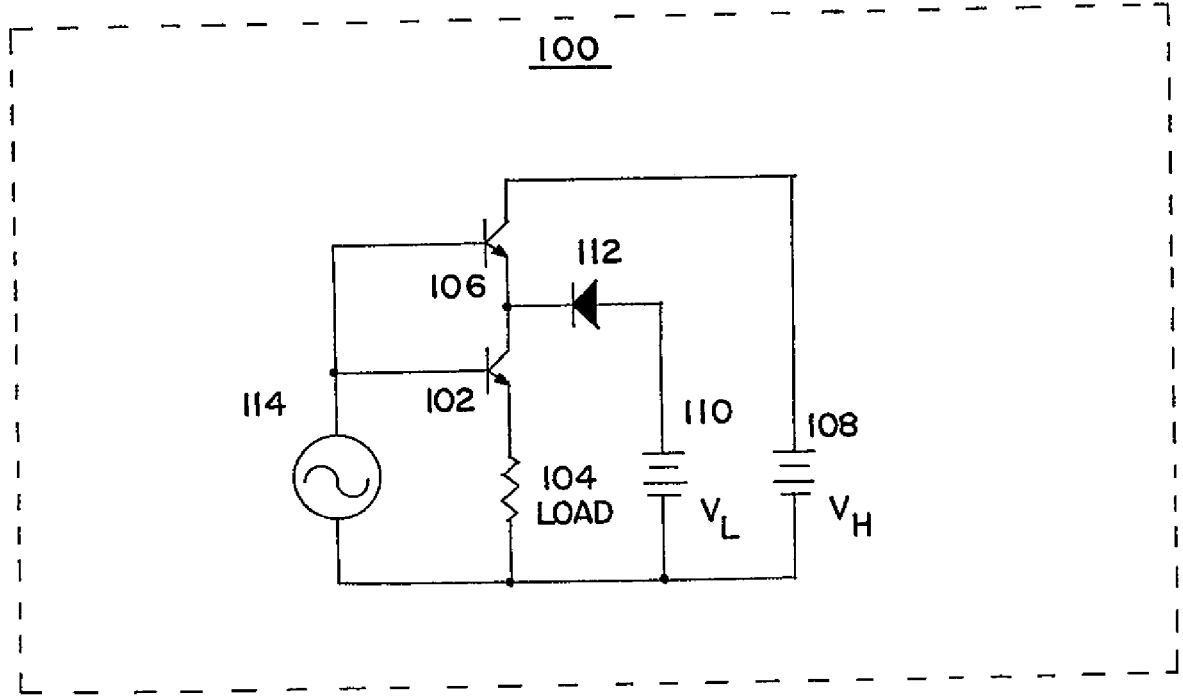
FIG. 2 is a circuit diagram of an amplifier having two selectable power supplies.
Figure 3:
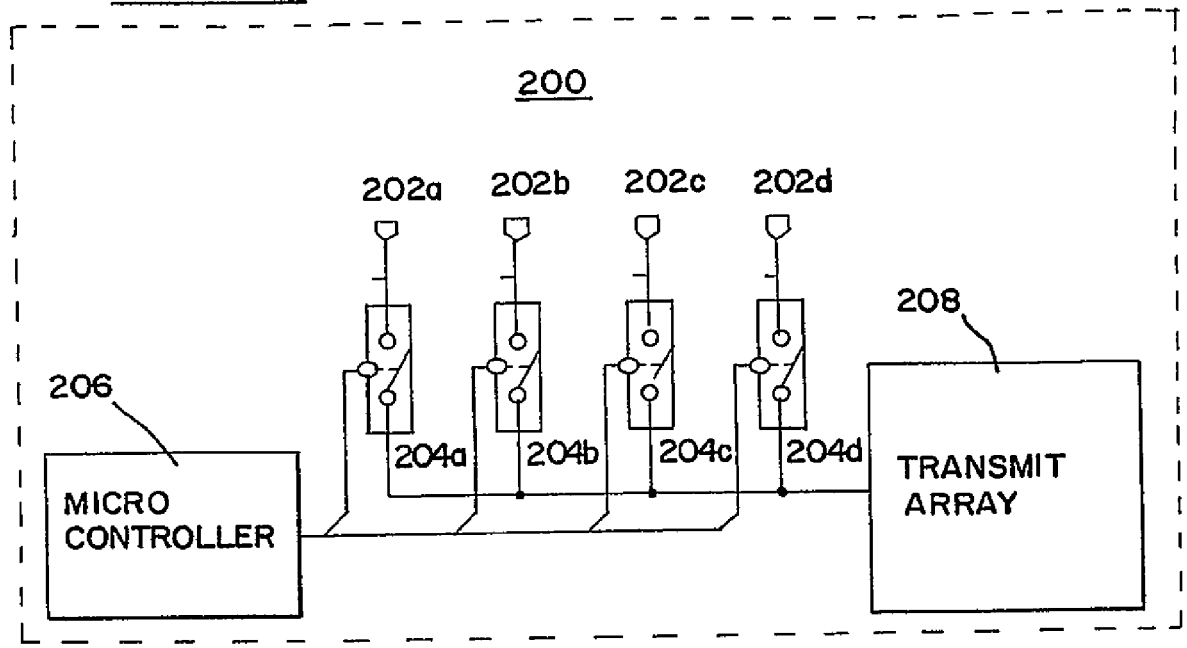
Figure 4:
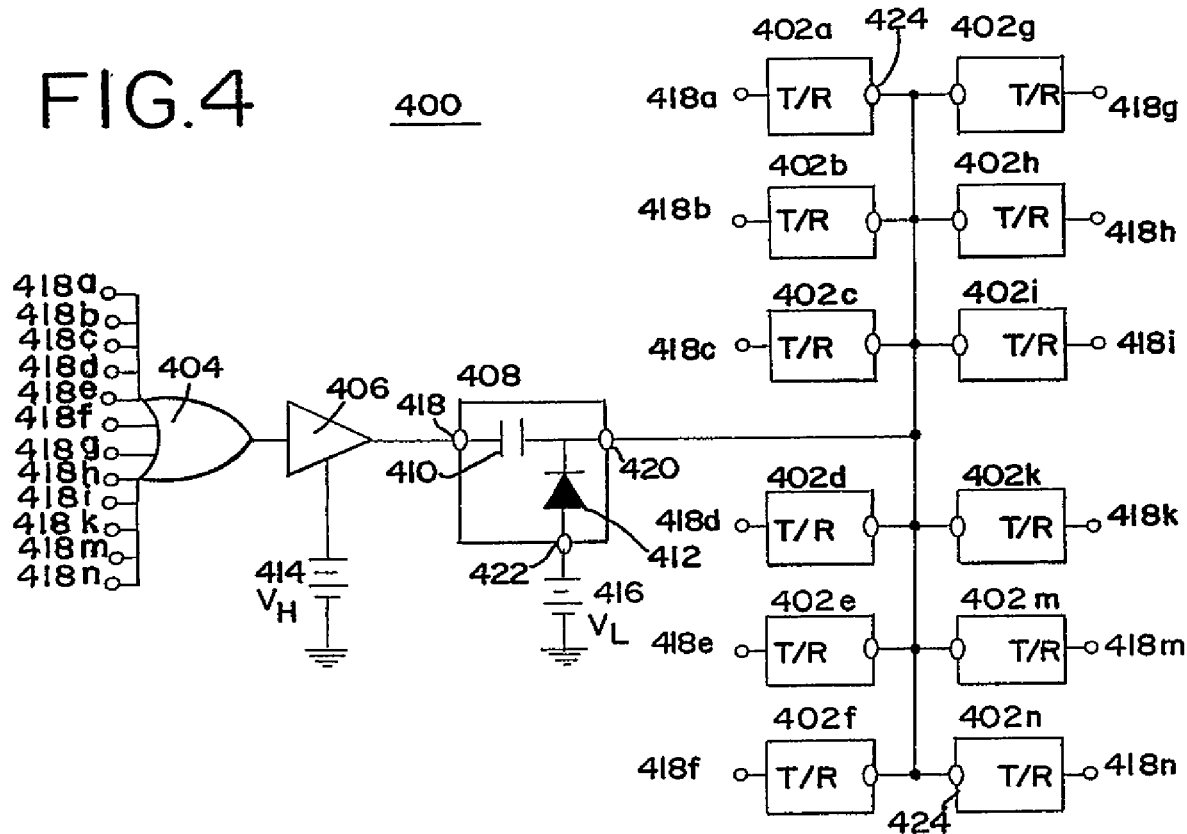

The issued patent was published with incorrect Figures 1 and 2, which are completely unrelated to this application. Delete Fig. 1 and Fig. 2, and replace with the below:

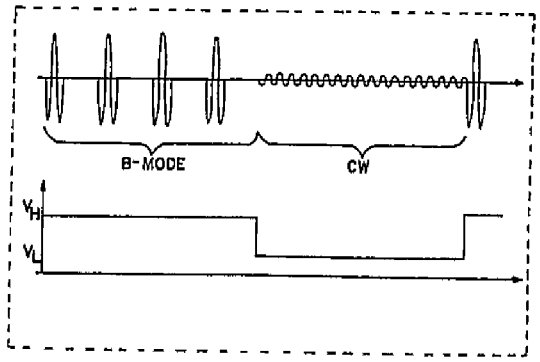

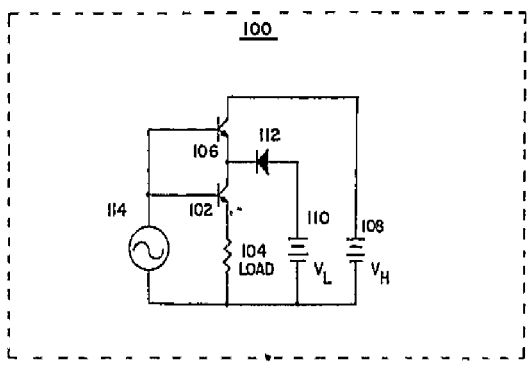

Signed and Sealed this

Thirtieth Day of January, 2007

JON W. DUDAS
*Director of the United States Patent and Trademark Office*